United States Patent
Torres et al.

(10) Patent No.: US 6,608,650 B1
(45) Date of Patent: Aug. 19, 2003

(54) INTERACTIVE ASSISTANT PROCESS FOR AIDING A USER IN CAMERA SETUP AND OPERATION

(75) Inventors: Dan Torres, San Carlos, CA (US); Eric Anderson, San Jose, CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 0 days.

(21) Appl. No.: 09/203,906

(22) Filed: Dec. 1, 1998

(51) Int. Cl.[7] ............................................. H04N 5/222
(52) U.S. Cl. .......................... 348/333.02; 348/231.3; 382/311; 345/709
(58) Field of Search ....................... 348/231.2, 231.3, 348/231.5, 231.6, 333.01, 333.02, 333.04, 333.05, 333.11, 333.12; 345/709, 705, 707; 382/167, 255, 311

(56) References Cited

U.S. PATENT DOCUMENTS

| 5,247,327 A | * | 9/1993 | Suzuka et al. ............... 396/109 |
| 5,481,667 A | * | 1/1996 | Bieniek et al. .............. 345/709 |
| 5,528,293 A | * | 6/1996 | Watanabe ................. 348/231.2 |
| 5,773,810 A | * | 6/1998 | Hussey et al. ......... 235/462.25 |
| 5,907,315 A | * | 5/1999 | Vlahos et al. ............... 345/600 |
| 6,023,697 A | * | 2/2000 | Bates et al. .................. 345/709 |
| 6,128,013 A | * | 10/2000 | Prabhu et al. ............... 345/707 |
| 6,285,398 B1 | * | 9/2001 | Shinsky et al. ............. 345/603 |
| RE37,431 E | * | 10/2001 | Lanier et al. ................ 345/707 |
| 6,300,950 B1 | * | 10/2001 | Clark et al. .................. 345/705 |
| 6,307,544 B1 | * | 10/2001 | Harding ....................... 345/709 |
| 2002/0105582 A1 | * | 8/2002 | Ikeda ....................... 348/231.3 |

FOREIGN PATENT DOCUMENTS

| JP | 05150308 A | * | 6/1993 | ........... G03B/17/18 |
| JP | 05260351 A | * | 10/1993 | .......... H04N/5/225 |
| JP | 06060078 A | * | 3/1994 | ........... G06F/15/20 |

\* cited by examiner

*Primary Examiner*—Wendy R. Garber
*Assistant Examiner*—John M Villecco
(74) *Attorney, Agent, or Firm*—Sawyer Law Group LLP

(57) ABSTRACT

A system and method for providing user assistance to a user of a digital image device. The present invention, referred to as an interactive context assistant, includes computer-readable instructions stored in a memory unit of the digital image device which are executed by a central processing unit. The present invention is configured to automatically recognize an attribute of the image data. The present invention also includes a database which specifies the user assistance according to the attribute of the image data. The present invention retrieves from the database the user assistance corresponding to the attribute and provides the user assistance to the user via a user interface.

18 Claims, 6 Drawing Sheets

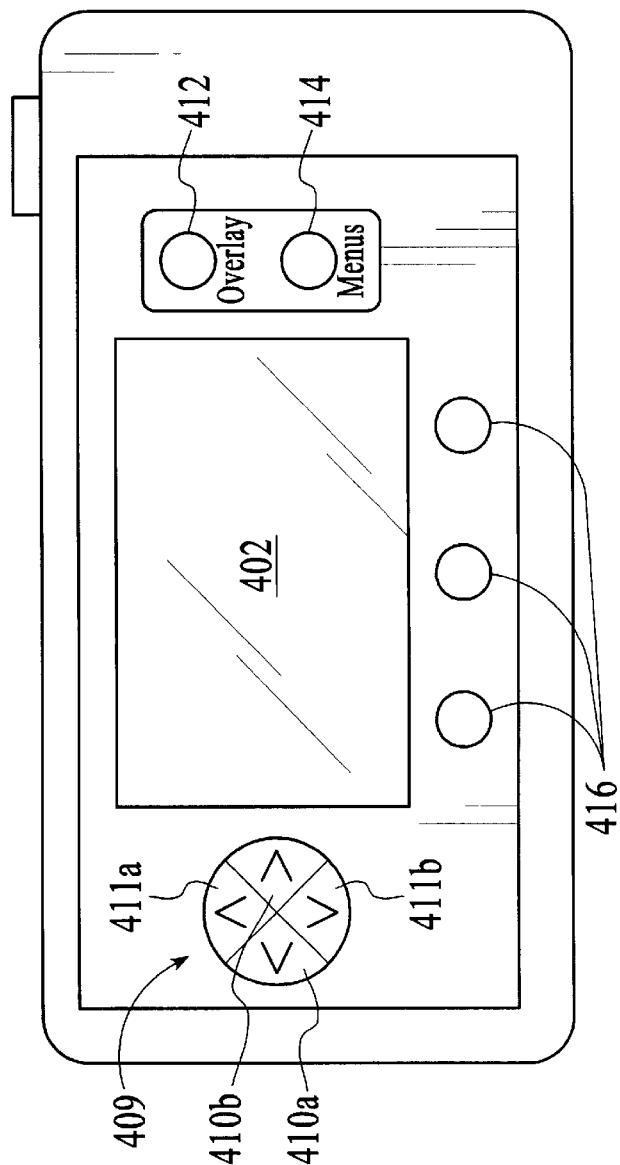
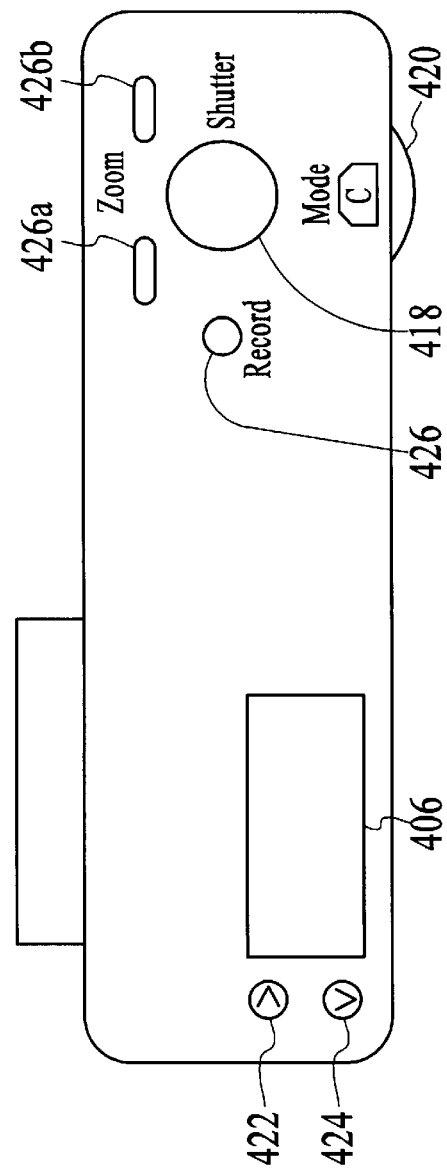
FIG. 2A
FIG. 2B

INTERACTIVE ASSISTANT PROCESS FOR AIDING A USER IN CAMERA SETUP AND OPERATION

FIELD OF THE INVENTION

The field of the present invention pertains to the analysis and processing of electronic data. More particularly, the present invention relates to a digital image device.

BACKGROUND OF THE INVENTION

Digital image devices, such as but not limited to digital cameras, are an increasingly popular means for capturing images (in other words, for taking pictures) and for processing the resulting image data.

The digital image devices encompass features not present on a conventional camera, and so users are provided with a large number of options that otherwise would not be available. In digital cameras, images are represented by data and stored either in the camera's memory or an external memory device from which they can be accessed by the user. A significant advantage to digital cameras is that users then have the capability to manipulate the image data in a number of ways. Users are able to operate on and modify the images, transfer them to other devices, incorporate them into documents, display them in a variety of formats, and the like. Thus, in comparison to conventional cameras, digital cameras introduce a variety of capabilities and enhancements to the consumer's advantage. However, with that advantage also comes increased complexity. This complexity is not necessarily due to the commands and processes that the user needs to follow to utilize the digital camera's advantages; it is also associated with the user's knowledge and skills as a photographer.

The assignee of the present application has recently developed an operating system that manages the internal processes of a digital camera and also provides an external user interface. The digital camera operating system is coupled to an interface device that displays information to the digital camera user, and the interface device is also used by the camera user to input commands and make menu selections. The digital camera incorporates a central processing unit, memory, and many other features of a computer system. Accordingly, the digital camera is capable of concurrently running multiple software routines and applications to control and coordinate the various processes of the camera. However, the experience with personal computers shows that, at least initially, many consumers are familiar with only the rudiments of operating a computer system.

Thus, a disadvantage to prior art digital cameras is that consumers new to the technology of digital cameras may not realize all the advantages offered by the camera without instruction and experience. While some basic features of a prior art digital camera, such as camera focus, are automated and thus simplify camera operation, other features are not. A further disadvantage is that an advanced application, whether a standard feature or add-on software that increases the camera's capability, may not gain acceptance because of its perceived complexity.

In the field of personal computers, these disadvantages have been addressed in part through the use of help systems. A large number of applications, exist that are effectively utilized on personal computers and that, when used properly, provide the consumer with the means to produce documents and other items that are highly professional in appearance. Hence, software vendors and other manufacturers interested in gaining consumer acceptance of their products typically include a help system to provide assistance to users.

In a typical prior art help system, the user opens a help screen and searches an index to find help associated with the function that the user desires to accomplish. The user then reads and follows the directions displayed by the help system. Similarly, some help systems recognize the broad function the user is in the process of attempting to complete and then display either an index or directions for only that broad function, thereby narrowing the user's search and facilitating the process of providing help. In more advanced help systems, a "wizard" is activated that guides the user step by step through the process that the user wishes to accomplish.

A familiar example in the prior art is the help system in a word processing application such as Microsoft Word. Consider the case in which the user wishes to create a table in a document and desires assistance. In this case, the user activates a help screen in the table menu of Word and receives assistance specifically associated with creating a table. The assistance typically comprises a set of instructions which the user reads and then implements. In the more advanced help system, a wizard implements a step-by-step process to build a table, presenting the user with options that eventually result in a table being created in accordance with the user's specifications.

However, the prior art help systems are limited in the level of assistance they are able to provide to the digital camera user. Help systems used in personal computers are not applicable to digital cameras due to user interface problems; as noted above, the help systems associated with personal computers are very specific to the application for which the help is being provided. While prior art help systems may be considered satisfactory for applications in the field of desk top publishing and the like that are implemented on personal computers, they are not capable of providing the level of assistance required in the field of digital cameras. To take a good photograph, a number of factors have to be considered, balanced against each other, and combined to achieve the desired quality and effect. Prior art help systems, comparatively speaking, are capable of providing only a basic level of assistance that is not sufficient for application to digital camera photography. Thus, prior art help systems do not have the sophistication needed for application to digital cameras and consequently cannot provide the level of assistance needed to help a user take better photographs.

Thus, a need exists for a system and/or method for providing user assistance for digital image devices such as digital cameras. The system or method should assist the user in the operation of the digital image device, including both fundamental. Operations and advanced features. Such a system or method should also help the user take and display better pictures. In addition, the system or method should accomplish the above needs and support enhanced camera applications. The present invention provides a novel solution to the above needs.

SUMMARY OF THE INVENTION

The present invention provides a system and method for providing user assistance for digital image devices such as digital cameras. The present invention assists the user in the operation of the digital image device, including both fundamental operation and advanced features. The present invention also helps the user take and display better pictures. In addition, the present invention accomplishes the above needs and supports enhanced camera applications.

In the present embodiment, the present invention includes computer-readable instructions referred to as an interactive context assistant and loaded into a memory unit of a digital image device. The interactive context assistant is configured to automatically recognize attributes of the image data and to automatically provide user assistance corresponding to those attributes. The present invention also includes a database in communication with the interactive context assistant which contains specific user assistance corresponding to the attributes of the image data. In one embodiment, the database is integral to the interactive context assistant, and in another embodiment the interactive context assistant and the database are separate.

The attributes of the image data recognized by the interactive context assistant include the sharpness, brightness, contrast, and color associated with the captured image. Other attributes associated with the image data include the exposure time, shutter, f-stop, white balance setting, and focus distance.

Based on an analysis of the image data to identify which attributes of the image data can be improved, the present invention automatically retrieves from the database the specific user assistance corresponding to those attributes and provides the appropriate user assistance to the user. For example, the image data from a first image and from a second image of the same scene are compared, and then user assistance is provided according to the results of the comparison.

The present invention can also query the user based on the analysis of the image data. The present invention reads the response to the query from the user, automatically retrieves from the database the specific user assistance corresponding to the response, and provides the appropriate user assistance to the user.

Based on the user assistance provided by the present invention, the user adjusts the settings of the digital image device. In one embodiment, the present invention automatically adjusts the settings of the digital image device in response to a user query.

In addition to the data-based user assistance described above, the present invention automatically provides user assistance corresponding to time-based information, event-based information, user-based information, and/or product-based conditions. Thus, the present invention automatically recognizes what actions are being performed by the user, what it is the user wishes to accomplish, and/or what problems the user may be experiencing, and then automatically provides the appropriate user assistance to assist the user in the operation of the digital image device and in response to any problems that may be experienced. In one embodiment, the digital image device automatically takes action in response to the diagnosis by the present invention of the time-based, event-based, user-based and/or product-based conditions.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The present invention is illustrated by way of example and not by way of limitation, in the figures of the accompanying drawings in which like reference numerals refer to similar elements and in which:

FIGS. 2A and 2B are, respectively, a rear elevation view and a top elevation view of one embodiment of the digital camera of FIG. 1 in accordance with the present invention.

DETAILED DESCRIPTION OF THE INVENTION

The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any digital image device which processes, displays and/or prints digital images, icons and/or other items could incorporate the features described hereinbelow and that device would be within the spirit and scope of the present invention. Thus, the present invention is not intended to be limited to the embodiment shown but is to be accorded the widest scope consistent with the principles and features described herein.

Figure 1:
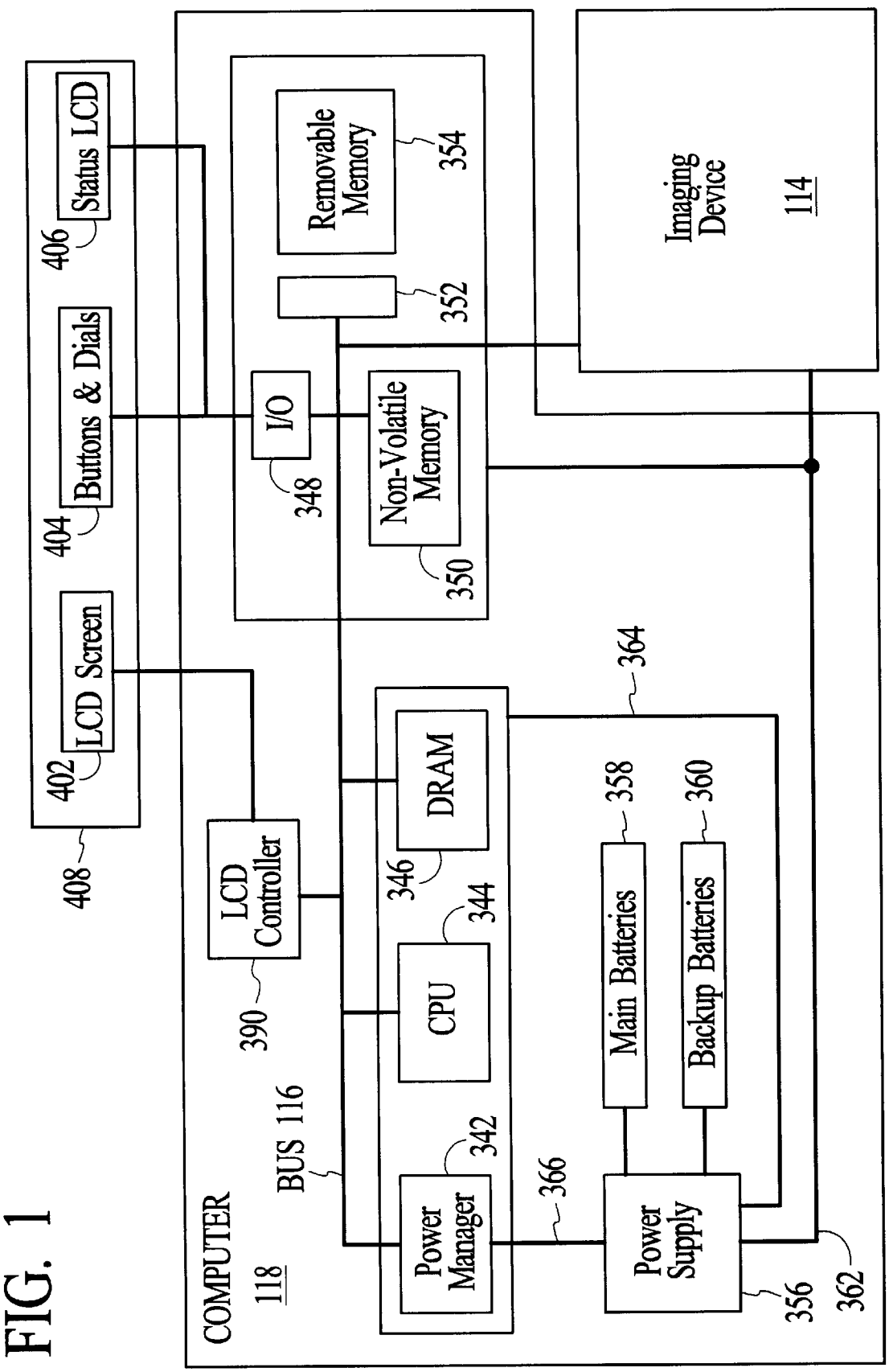
FIG. 1 is a block diagram of one embodiment of a digital camera in accordance with the present invention.

Referring now to FIG. 1, a block diagram of one embodiment of digital camera 110 is shown for use in accordance with the present invention. Digital camera 110 preferably comprises imaging device 114, system bus 116 and computer 118. Imaging device 114 includes an image sensor, such as a charged coupled device (CCD) or a complementary metal-oxide semiconductor (CMOS) sensor, for generating a set of raw image data representing a captured image. In a preferred embodiment, system bus 116 provides connection paths between imaging device 114, optional power manager 342, central processing unit (CPU) 344, dynamic random-access memory (DRAM) 346, input/output interface (I/O) 348, non-volatile memory 350, and buffers/connector 352 that connect optional removable memory 354 to system bus 116.

CPU 344 may include a conventional processor device for controlling the operation of digital camera 110. In the preferred embodiment, CPU 344 is capable of concurrently running multiple software routines to control the various processes of digital camera 110 within a multi-threaded environment. For example, images may be captured at the same time that previously captured images are processed in the background to effectively increase the capture rate of the camera. In a preferred embodiment, CPU 344 runs an operating system capable of providing a menu-driven graphical user interface (GUI) and software image processing. An example of such software is the Digita™ Operating Environment by FlashPoint Technology of San Jose, Calif.

Continuing with reference to FIG. 1, I/O 348 is an interface device allowing communications to and from computer 118. For example, I/O 348 permits an external host computer (not shown) to connect to and communicate with computer 118. I/O 348 also interfaces with a plurality of buttons and/or dials 404, and optional status liquid crystal display (LCD) 406, which in addition to LCD screen 402, are the hardware elements of the digital camera's user interface 408.

Non-volatile memory 350, which may typically comprise a conventional read-only memory or flash memory, stores a set of computer-readable program instructions to control the operation of digital camera 110. Removable memory 354 serves as an additional image data storage area and is preferably a non-volatile device, such a flash disk, that is readily removable and replaceable by the user of digital camera 110 via buffers/connector 352.

With reference still to FIG. 1, power supply 356 supplies operating power to the various components of digital camera 110. Power manager 342 communicates via line 366 with power supply 356 and coordinates power management operations for digital camera 110. In the preferred embodiment, power supply 356 provides operating power to main power bus 362 and also to secondary power bus 364. Main power bus 362 provides power to imaging device 114, I/O 348, non-volatile memory 350 and removable memory 354. Secondary power bus 364 provides power to power manager 342, CPU 344 and DRAM 346.

Power supply 356 is connected to main batteries 358 and also to backup batteries 360. In the preferred embodiment, a user of digital camera 110 user may also connect power supply 356 to an external power source. During normal operation of power supply 356, main batteries 358 provide operating power to power supply 356 which then provides the operating power to digital camera 110 via both main power bus 362 and secondary power bus 364. During a power failure mode in which main batteries 358 have failed (when their output voltage has fallen below a minimum operational voltage level), backup batteries 360 provide operating power to power supply 356 which then provides the operating power only to secondary power bus 364 of digital camera 110.

DRAM 346 is a contiguous block of dynamic memory that may be selectively allocated for various storage functions. DRAM 346 stores both raw and compressed image data and is also used by CPU 344 while executing the software routines used within computer 118. The raw image data received from imaging device 114 are temporarily stored in several input buffers (not shown) within DRAM 346. Once the raw image data are processed, the data are stored in a frame buffer (not shown) for display on LCD screen 402. Finally, LCD controller 390 accesses DRAM 346 and transfers processed image data to LCD screen 402 for display.

FIGS. 2A and 2B are diagrams depicting the preferred hardware components of user interface 408 (FIG. 1) of digital camera 110. FIG. 2A is a back view of digital camera 110 showing LCD screen 402, four-way navigation control button 409, overlay button 412, menu button 414, and a set of programmable soft keys 416.

FIG. 2B is a top view of digital camera 110 showing shutter button 418, and mode dial 420. The digital camera may optionally include status LCD 406, status LCD scroll button 422 and select button 424, sound record button 426, and zoom-in, zoom-out buttons 426a and 426b.

With reference back to FIG. 2A, digital camera 110 is provided with several different operating modes for supporting various camera functions The modes relevant to this description are capture or record mode for capturing images, and play mode for playing back the captured images on LCD screen 402. In capture mode, digital camera 110 supports the actions of preparing to capture an image and of capturing an image. In review mode, digital camera 110 supports the actions of reviewing camera contents, editing and sorting images, and printing and transferring images. In play mode, digital camera 110 allows the user to view screen-sized images in the orientation that the image was captured. Play mode also allows the user to hear recorded sound associated to a displayed image, and to play back sequential groupings of images, which may comprise time lapse, slide show, and burst image images. The user preferably switches between the capture, review, and play modes.

With reference still to FIG. 2A, to take A picture, digital camera 110 must be placed into capture mode. If LCD screen 402 is activated, then the camera displays to the user a "live view" of the object viewed through the camera lens on LCD screen 402 as a successive series of real-time frames. If LCD screen 402 is not activated, then the user may capture an image using a conventional optical viewfinder (not shown).

Continuing with reference to FIG. 2A, during the execution of live view generation, frames of raw image data are sequentially captured by imaging device 114 (FIG. 1) at a reduced resolution suitable for LCD screen 402, and the frames of raw image data are stored in DRAM 346 (FIG. 1). The live view generation process then performs gamma correction and color conversion on the raw CCD data to convert the data into either a RGB or YCC color format which is compatible with LCD screen 402. (RGB is an abbreviation for Red, Green, Blue, and YCC is an abbreviation for Luminance, Chrominance-red and Chrominance-blue.) The raw image data are also processed for extracting exposure, focus, and white balance settings, and the like. After converting each frame of data to YCC (typically, YCC 2:2:2 format), the YCC image data are transferred to LCD screen 402 for display.

The live view frames generated during live view generation are displayed until the user decides to capture the image (i.e., take a picture). When the user presses the shutter button to capture an image, the imaged data are captured at a resolution set by the user, transformed into YCC 4:2:2 color space, compressed (e.g., JPEG), and stored as an image file. Live view then resumes to allow the capture of another image. The user may then either continue to capture images or switch digital camera 110 to play mode in order to play back and view the previously captured images on LCD screen 402. In play mode, the user may also hear any recorded sound associated with a displayed image.

Figure 3:
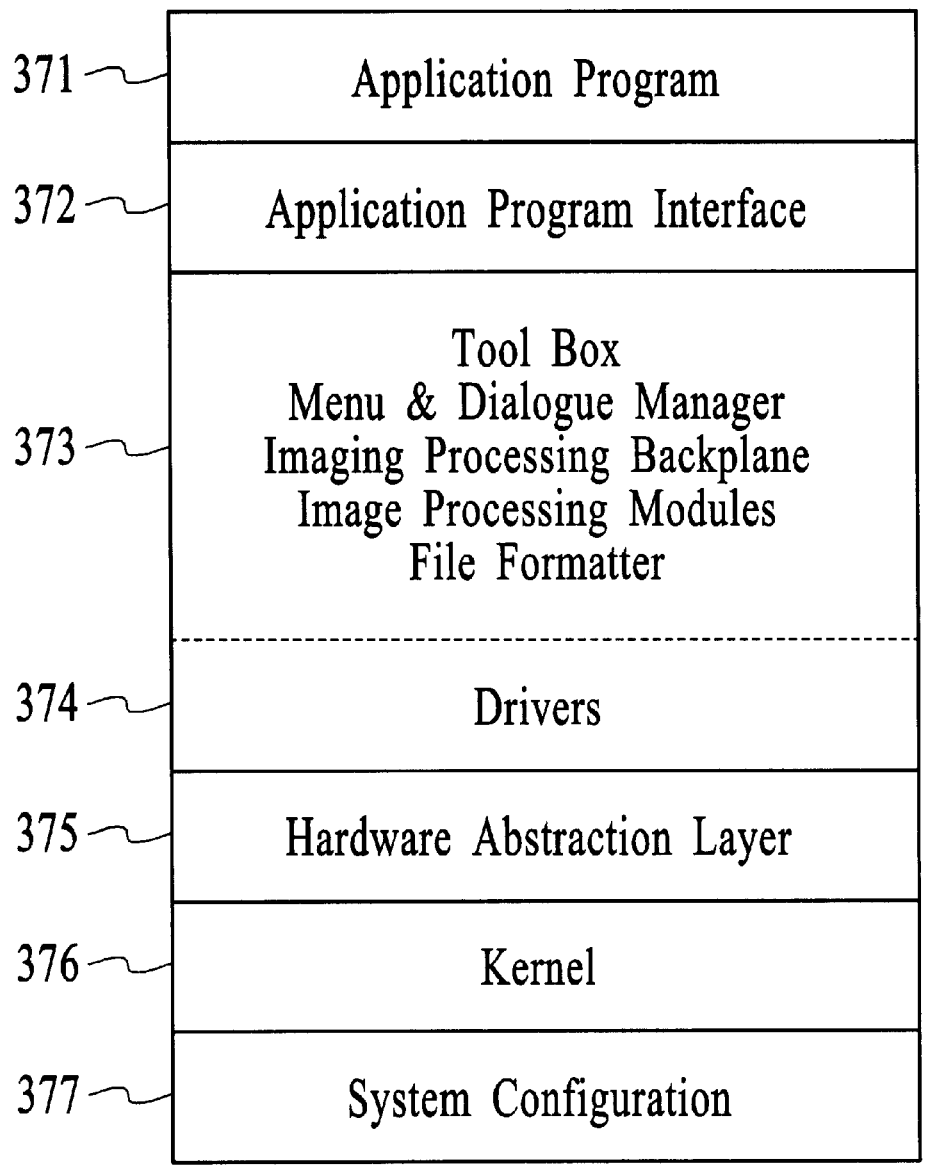
FIG. 3 is a diagram of one embodiment of the non-volatile memory of the digital camera of FIG. 1 in accordance with the present invention.

Referring now to FIG. 3, a diagram of one embodiment of non-volatile memory 350 of FIG. 1, is shown. Non-volatile memory 350 includes application program 371, application program interface 372, toolbox 373, drivers 374, hardware abstraction layer 375, kernel 376, and system configuration 377.

Application program 371 includes program instructions for controlling and coordinating the various functions of digital camera 110 (FIG. 1). Different application programs may be preferably loaded by the user into digital camera 110 depending on the planned uses of the camera. Application program interface 372 defines a standard interface between application program 371 and toolbox 373.

Toolbox 373 contains the various software routines used to control the various processes of digital, camera 110. In general, toolbox 373 provides software routines for printing images, displaying images, organizing data, and the like. Toolbox 373 includes a menu and dialogue manager, which comprises software routines that are used to provide information for controlling access to camera control menus and camera control menu items. The menus, in turn, enable communication between digital camera 110 and the user, and provide the user with access to the features of digital camera 110. Another software routine contained in toolbox 373 is the image processing backplane, which coordinates the functioning and communication of various image processing modules and handles the data flow between the various modules. Image processing modules include selectable plug-in software routines that analyze and manipulate captured image data in a variety of ways, depending on the particular module(s) selected. Also included in toolbox 373 is a file formatter consisting of software routines for creating an image file from processed image data.

Drivers 374 are for controlling various hardware devices within digital camera 110, such as the motors used to adjust the lens to change focus. Hardware abstraction layer (HAL) 375 defines a standard interface between toolbox 373/drivers 374 and the implementation hardware specific to the make and model of the digital camera. Kernel 376 provides basic underlying services for the operating system of digital camera 110. System configuration 377 performs initial start-up routines for digital camera 110, including the boot routine and initial system diagnostics.

The present invention is a set of program instructions, referred to as an interactive context assistant, inserted between application program 371 and toolbox 373 in non-volatile memory 350 of digital camera 110. As will be described in further detail later herein, the present invention interactive context assistant automatically provides user assistance to the user of digital camera 110 based on an analysis of captured image data. The interactive context assistant also automatically provides assistance to the user to operate the camera and to resolve problems the user may be experiencing. The user assistance provided by the present invention comprises automatic actions performed by the digital camera based on an intelligent analysis of the image data and the context in which the digital camera is being used. The user assistance provided by the present invention also comprises a menu-driven dialogue between the digital camera and the user, in which the present invention provides menu selections to the user based on an intelligent analysis of the image data as well as the context in which the digital camera is being used, and then automatically performs an action based on the user's input. The interactive context assistant communicates with the user using either an audible message, a visual display, or other suitable means, and the user communicates with the interactive context assistant through user interface 408 of FIG. 2A. In the present embodiment, the user has the option to deactivate the present invention interactive context assistant if so desired.

Figure 4:
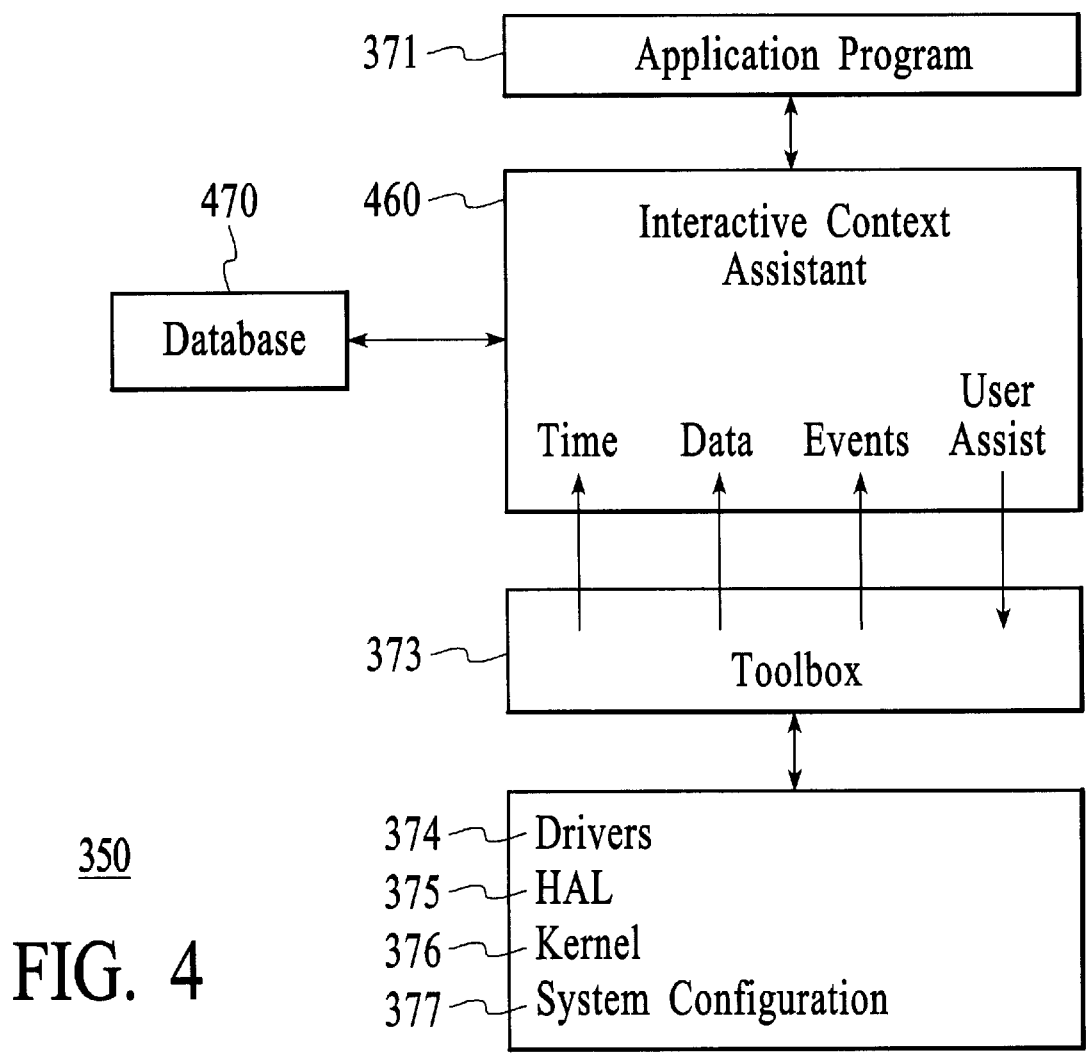
FIG. 4 is a diagram of one embodiment of the non-volatile memory of FIG. 3 incorporating the present invention interactive context assistant.

With reference now to FIG. 4, interactive context assistant 460 is in communication with application program 371 and toolbox 373. Interactive context assistant 460 comprises computer-readable program instructions implemented by computer 118 (FIG. 1). Interactive context assistant 460 is designed to be compatible with application 371 and toolbox 373.

In one embodiment, interactive context assistant 460 is stored in removable memory unit 354 (e.g., a disk or card) and is loaded into digital camera 110 at the user's preference. Interactive context assistant 460 may also be loaded into digital camera 110 from an external host computer system. In another embodiment, interactive context assistant 460 is conventionally stored in non-volatile memory 350.

The present invention also includes database 470. As will be explained in further detail below, database 470 contains a set of predetermined conditions defining when user assistance is required, and a set of rules, scripts, and other like information that define the user assistance to be provided corresponding to each of the predetermined conditions. In one embodiment, database 470 is stored on removable memory unit 354 and is loaded into digital camera 110 at the user's preference. Database 470 may also be loaded into digital camera 110 from an external host computer system. In another embodiment, database 470 is conventionally stored in non-volatile memory 350.

Furthermore, in one embodiment, database 470 is separate from interactive context assistant 460, while in another embodiment interactive context assistant 460 and database 470 are integrated into a single software routine. As will be seen, these features of the present invention provide a great deal of flexibility that allows user assistance to be provided that is compatible with a user's preferences and also with enhanced camera applications, such as add-on software that increases the camera's capabilities for specific applications. In addition, these features facilitate upgrades of either or both interactive context assistant 460 and database 470.

Continuing with reference to FIG. 4, interactive context program 460 receives data-based information, time-based information, event-based information and other like information (such as product-based and user-based information) from toolbox 373. This information serves as a trigger for identifying to interactive context assistant 460 when user assistance is potentially required. Interactive context assistant 460 uses this information to diagnose a condition, which is then compared to the predetermined conditions in database 470 so that the appropriate user assistance corresponding to the condition can be specified. In this manner, the present invention performs an intelligent analysis 6of the image data and the context of the data, as well as the context in which the digital camera is being utilized to automatically provide the appropriate user assistance. The specified user assistance is implemented via the software modules contained in toolbox 373. The present invention also interacts with the user via toolbox 373 (e.g., via the menu and dialogue manager).

A description of data-based, time-based, event-based, product-based, and user-based information is provided below to exemplify the type of information that may be included in each of these categories. However, It is understood that the present invention is not limited to these categories of information, or to the examples discussed in each category. Instead, it is the intention of the present invention to consider the available information provided by the processes and devices of the digital camera and then provide the appropriate user assistance according to the condition diagnosed from that information.

Data-based information includes information based on an analysis of the captured image data using software routines contained in toolbox 373. The analysis of the captured image data identifies attributes of the image data associated with the quality of the image; for example, the sharpness (e.g., focus), brightness, contrast and color of the image represented by the image data are analyzed and quantified. Data-based information also includes attributes of the image, data based on the settings of the digital camera when the image was captured. For instance, attributes such as exposure time, shutter speed, f-stop white balance setting, and focus distance are recorded by digital camera 110 when each image is captured, and the image data associated with each image include a record of these attributes. Data-based information also includes identification tags identifying a category (e.g., portrait, city image, indoor image, and the like) associated with the type of image that was captured. (Additional information regarding identification tags is provided in the copending patent application entitled "System and Method for Automatic Analysis and Categorization of Images in an Electronic Imaging Device," Filing Date Jul. 23, 1998, with Ser. No. 09/121,760, assigned to the assignee of the present application, Docket Number P153.)

Time-based information includes information pertaining to an action or event that should occur within a specified period of time but has not occurred within that period of time. Digital camera 110 also records actions taken and operations performed by the digital camera as a function of time, and this information is also provided to the present invention. In addition, in the present embodiment, periodic updates regarding the state of digital camera 110 are provided to interactive context assistant 460 and forwarded to the user; for example, information regarding the remaining capacity of removable memory 354 or main batteries 358 of FIG. 1.

Event-based information includes information pertaining to an event or action that has occurred in digital camera 110. For example, event-based information includes start-up of the camera, a change in the mode of operation of the digital camera (e.g., from capture mode to review mode), a button event (e.g., a button is pushed or a soft key is utilized), and a change in status of a hardware component (e.g., the attachment or detachment of a cable, the camera lens is moved from one focus position to another, or a disk is inserted or removed). Event-based information also includes the current operating mode of digital camera 110 (e.g., capture, review, play)

Product-based information includes information pertaining to the make and model of the digital camera, including features associated with the make and model. Because the present invention introduces the capability for the digital camera to automatically perform an action as part of the user assistance being provided, the product-based information also facilitates this feature.

User-based information includes information provided by each individual user to indicate the user's preferences, such as a specific setting or preferred mode of operation. Digital camera 110 may be used by different users of varying skill levels, and each user is able to specify the level of user assistance desired. The user then identifies himself/herself to interactive context assistant 460, which automatically switches to the type of operation customized according to the user's indicated preferences. User-based information also includes the user's response to a query issued by interactive context assistant 460.

Figure 5:
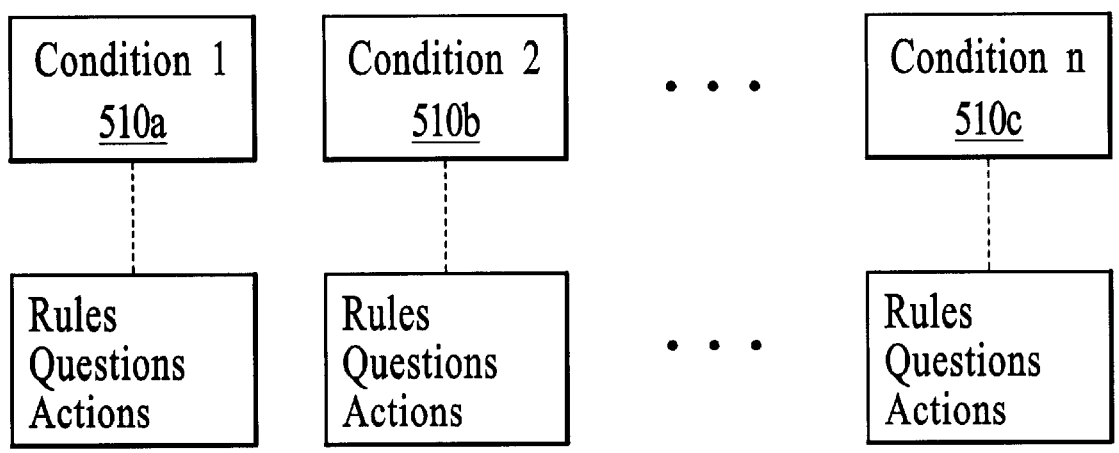
FIG. 5 is a diagram of one embodiment of the present invention interactive context assistant database.

With reference now to FIG. 5, the structure of database 470 is illustrated for the present embodiment of the present invention. Database 470 comprises a number of predetermined conditions 510*a*, 510*b* and 510*c* and a set of rules, scripts, questions, actions and the like associated with each condition. Interactive context assistant 460 correlates the information available and diagnoses the condition or conditions associated with that information, as described above in conjunction with FIG. 4. The condition(s) specified are matched against those contained in database 470, and the associated rules, scripts, etc., associated with the condition (s) are implemented to provide the appropriate user assistance and/or trigger user assistance activities.

In the present embodiment, database 470 is in a tabulated format; however, other formats and methods of organization are suitable. In the present embodiment, the conditions and their corresponding rules, questions, etc., can be applied in combination or sequentially.

Figure 6:
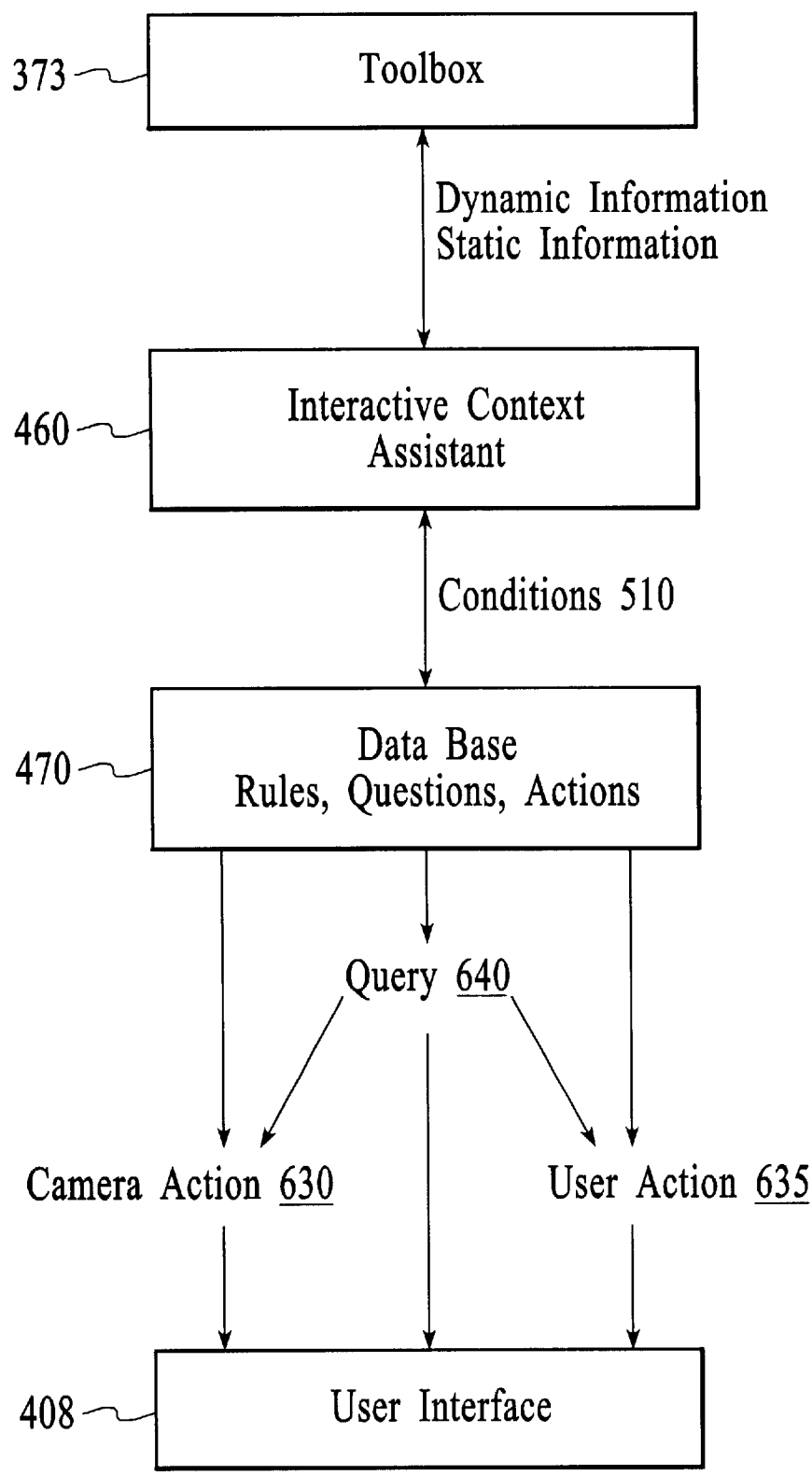
FIG. 6 is a block diagram illustrating the interaction between the components and modules in the digital camera of FIG. 1 associated with providing user assistance in accordance with the present invention.

FIG. 6 is a block diagram illustrating the interaction between the components and modules in digital camera 110 (FIG. 1) that are associated with providing user assistance in accordance with the present invention. Dynamic information, such as data-based information, event-based information, and the like as previously described above, is communicated from toolbox 373 to interactive context assistant 460. For example to address a situation where a user is experiencing a problem operating digital camera 110, toolbox 373 (operating in conjunction with the underlying software illustrated in FIGS. 3 and 4) monitors the period of time that the user is taking to complete a particular operation. Information regarding the time the user is taking is forwarded from toolbox 373 to interactive context assistant 460. Similarly, if an image has been captured, an analysis module in toolbox 373 (e.g., the image processing module of FIG. 3) analyzes the image data to identify particular attributes of the data, such as sharpness, brightness, and the like as, previously described. Likewise, event-based information derived, for example, from a button being pushed is also forwarded to interactive context assistant 460. This dynamic information, in conjunction with static information such as user settings and the product-based information described above, is available to interactive context assistant 460 via toolbox 373. Thus, in this manner, the present invention is able to identify the context in which user assistance is required—that is, how the digital camera is being used and the problems that are being experienced—as well as the quality (attributes) of the image.

Continuing with reference to FIG. 6, interactive context assistant 460 correlates the information received from toolbox 373 to specify condition 510 that is used as the basis for defining the user assistance to be provided. For example, if the data-based information indicates that the captured image is not in focus, this condition is recognized by interactive context assistant 460. As another example, from the time-based information, interactive context assistant 460 recognizes the condition that a predetermined time limit associated with a particular operation is being exceeded. Interactive context assistant 460 then draws on the information contained in database 470 to specify the type of user assistance that is needed according to the condition(s) identified.

As discussed above, database 470 contains a tabulated set of rules, scripts, etc., to provide user assistance corresponding to each condition. When a condition occurs, interactive context assistant matches it against the set of conditions contained in database 470. The actions specified in database 470 are then implemented by digital camera 110 via toolbox 373. The actions that are specified can be completed either in combination with other specified actions or in sequence. Note also that a combination of conditions can exist, and actions can be specified depending on the unique combination of conditions that exists. Thus, if conditions 1, 2 and 3 exist, for example, then the actions specified may be different than the sum of the actions specified for each individual condition.

With reference still to FIG. 6, the user assistance provided by the present invention is drawn from database 470 and is implemented either by digital camera 110 (e.g., camera action 630) or by the user (e.g., user action 635), orbit results in query 640 to the user.

Camera action 630 includes, for example, automatically changing a mode of operation, a particular camera setting, or the like, either in response to the user assistance specified by database 470 or in response to a user input. Camera action 630 also includes issuing an alert (perhaps an audible tone or a visual signal). In general, camera action 630 is an automatic action implemented by digital camera 110 in response to a condition diagnosed by interactive context assistant 460.

User action 635 is an action automatically prompted by interactive context assistant 460 and database 470 but requires user intervention to complete. For example, interactive context assistant 460 recognizes that insufficient light is present for a satisfactory image, and so it prompts the user to insert a flash unit.

Query 640 is intended to elicit more information from the user or to confirm with the user a conclusion drawn by interactive context assistant 460. For example, interactive context assistant 460 may conclude that a captured image is too bright but, prior to automatically altering a camera setting to compensate, it requests that the user confirm that the picture is not satisfactory. Then, based on the user's response, another query is issued, or camera 630 action or user action 635 is specified from database 470.

Continuing with reference to FIG. 6, in the present embodiment, the user assistance is communicated to the user via user interface 408, although as previously discussed, alternate means may be used in accordance with the present invention. The user is also informed of automatic actions implemented by digital camera 110 in response to interactive context assistant 460.

Figure 7:
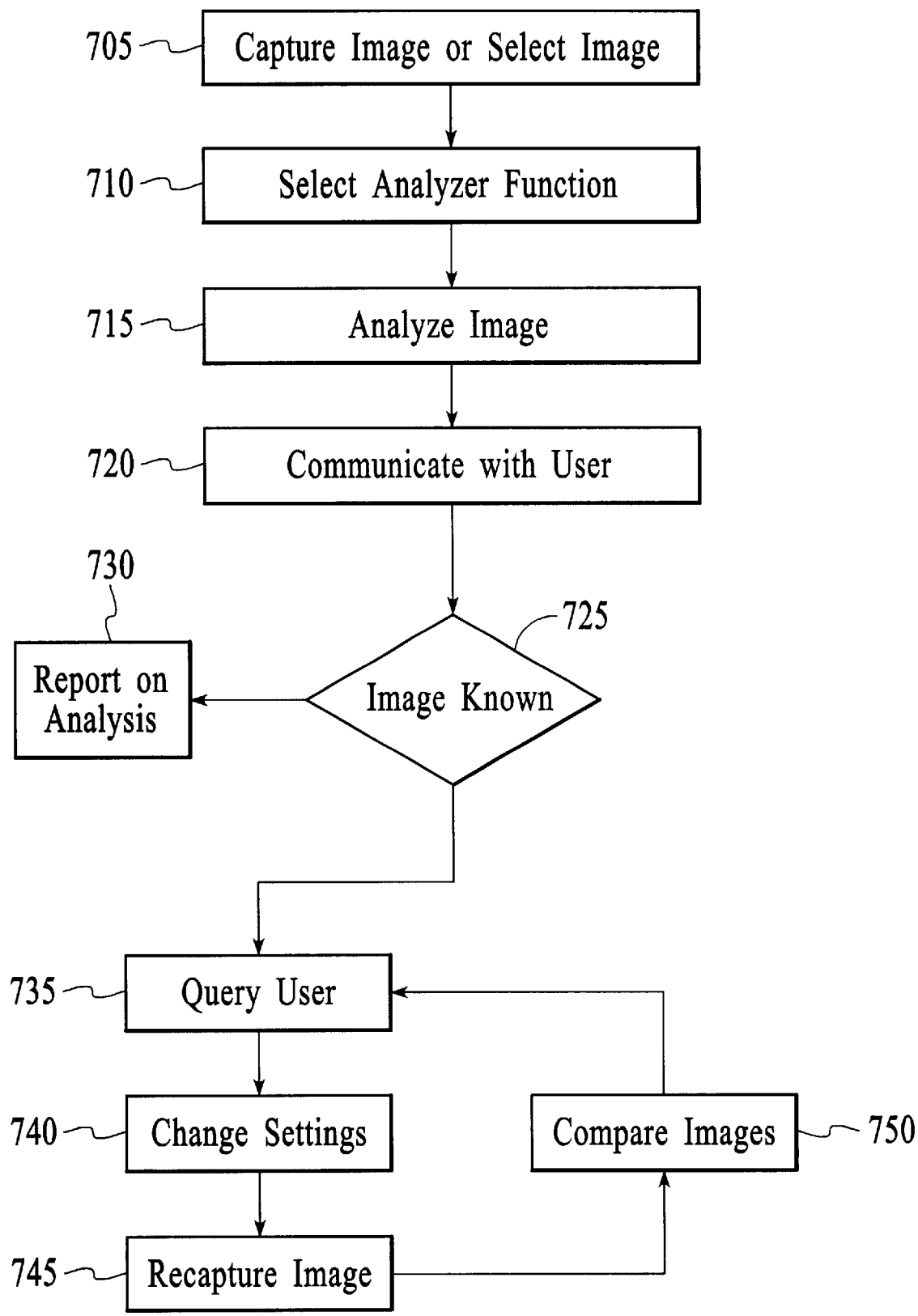
FIG. 7 is a flowchart for one embodiment of a process for providing user assistance in accordance with the present invention.

With reference now to FIG. 7, process 700 for providing user assistance via image analysis in accordance with the present invention is illustrated. Process 700 is implemented as computer-readable program instructions stored in non-volatile memory 350 and executed by computer 118 (i.e., CPU 344) in digital camera 110 (FIG. 1). Process 700 is described for a case primarily involving data-based information; however, as discussed above, the present invention is also suited for other types of information.

In step 705, the image to be analyzed in accordance with the present invention is identified. The image can be either an image that has just been captured and is being displayed to the user on LCD 402 (FIG. 2A), or it can be an image taken earlier and then stored as previously described herein.

In step 710, the user indicates if user assistance through the present invention interactive context assistant is desired. Alternatively, the interactive context assistant automatically is implemented. As discussed above, the user also has the option to deactivate the interactive context assistant. Note that this step can also be completed during start-up.

In step 715, depending on the response from step 710, the captured image is analyzed using an image processing module in toolbox 373 (FIG. 3). For example, in the present embodiment, a matrix analysis is performed of the image by breaking the image down into zones, and then each zone is analyzed in comparison with the surrounding zones. The analysis also includes the identification tags assigned to the image data as described previously herein. These identification tags indicate whether the image is categorized as an image of a person or a landscape, for example. The identification tags also provide details regarding the state of digital camera 110 when the image was captured; that is, the identification tags provide information regarding the camera settings, exposure time, shutter speed, white balance values, f-stops, and focus distance. Hence, a plethora of information is available to assist in the analysis of the image. The matrix analysis is thereby cued to anticipate a particular pattern of shade and light, among other attributes, and it then compares the image against that particular pattern. The matrix analysis next assesses the quality of the image and intelligently makes suppositions regarding the attributes of the image data (e.g., brightness, sharpness, contrast, and color).

With reference back to FIG. 6, the attributes of the image data derived from the intelligent analysis of step 715 are correlated by interactive context assistant 460 to recognize conditions (e.g., condition 510 of FIG. 6) that are in turn used as the basis for defining the user assistance to be provided. By matching the attributes of the image data against the conditions contained in database 470, the proper conditions are recognized and the associated rules, etc., are used to formulate query 640.

With reference again to FIG. 7, in step 720, interactive context assistant 460 communicates query 640 to the user. Thus interactive context assistant 460 automatically communicates its suppositions regarding the captured image data to the user, in accordance with the rules, questions, etc., contained in database 470. As discussed above, the communication can occur via an audible message, a visual display, or any other suitable means. The user responds via buttons or soft keys (refer to FIGS. 2A and 2B), and the software modules in toolbox 373 (e.g., the menu and dialogue manager of FIG. 3) read the user's responses and forward them to interactive context assistant 460. Based on the responses, interactive context assistant 460 modifies its suppositions regarding the attributes of the image data.

In step 725, interactive context assistant 460 automatically refines its suppositions and conclusions and achieves a satisfactory conception of the captured image that is consistent with the user's input.

In step 730, in the present embodiment, interactive context assistant 460 again communicates with the user, providing a summary report of the results of the analysis of the captured image.

In step 735, interactive context assistant 460 continues the process of providing user assistance. Again, using the rules, etc., from database 470 associated with the conditions (e.g., image data attributes) derived from the image analysis, the user is automatically queried regarding whether the user is satisfied with the image. At this point, the user is also queried regarding which attributes of the image the user is satisfied with, and which attributes the user would like to see improved. The user is also queried regarding whether or not he/she would like to recapture the image.

In step 740, based on the user's responses from step 735, interactive context assistant 460, using the rules, etc., from database 470, specifies new camera settings to improve the quality of the captured image. In one embodiment, the new camera settings are automatically implemented by interactive context assistant 460.

In step 745, the image is recaptured as described previously in conjunction with FIGS. 2A and 2B.

In step 750, the recaptured image is compared to the preceding captured image using an image processing module in the manner described previously in conjunction with step 715. At this point, interactive context assistant 460 again queries the user as described by step 735 above, and the interaction between the present invention and the user continues until a satisfactory image is captured.

Thus, in the manner described above in conjunction with FIGS. 6 and 7, the present invention uses advantageously the richness of the data available with a digital camera. The present invention provides the capability to analyze the data and what the data represent, and makes recommendations to the user based on the data analysis. The present invention analyzes the data in the contexts in which the data were acquired and are being used, and can suggest improvements to the user based on those contexts.

Referring back to FIG. 4, it was noted that, in one embodiment, interactive context assistant 460 and database 470 can be integrated as one software package, or in another embodiment, interactive context assistant 460 and database 470 are separate from each other although in communication with each other. In addition, it was noted that these elements can be dynamically loaded into digital camera 110 from an external source, such as an external host computer system or a disk, or they can be conventionally stored in non-volatile memory 350 of FIG. 1.

This arrangement is advantageous because it facilitates upgrading interactive context assistant 460 and database 470. For example, it is possible to upgrade the program instructions in interactive context assistant 460 only, if no changes are needed to database 470, and vice versa. This arrangement is also advantageous because it provides flexibility to allow user assistance to be specified according to the user's preferences and the specific application. Consider a case in which the user wishes to capture images of a golf swing, a continuous event in which numerous images are needed in a short period of time. Based on an understanding of the program instructions in interactive context assistant 460, a database of conditions and associated rules, scripts, etc., unique to this application can be developed and dynamically loaded into digital camera 110. Alternatively, an interactive context assistant unique to this application can be developed based on an understanding of the operating system used in the digital camera, should this prove to be a better approach for addressing a particular camera application. The user simply needs to swap out one disk for another; however, as the size of the memory in digital cameras continues to increase, it may not be necessary to swap this information out. Hence, the present invention is well-suited to enhancements that aid the user and expand the capabilities of a digital camera.

Thus, the present invention provides a system and method for providing user assistance for digital image devices including digital cameras. The present invention assists the user in both the fundamental operation, of digital camera and with advanced camera features. The present invention also helps the user take and display better pictures by analyzing the image data and the camera's settings, and then making recommendations to the user and changes the digital camera's settings. In addition, the present invention supports enhanced camera applications, by providing user assistance for specific applications loaded into the digital camera by the user.

The user assistance provided by the present invention comprises automatic actions performed by the digital camera based on an intelligent analysis of the image data and the context in which the digital camera is being used. The user assistance provided by the present invention also comprises a menu-driven dialogue between the digital camera and the user, in which the present invention provides menu selections to the user based on an intelligent analysis of the image data as well as the context in which the digital camera is being used, and then automatically performs an action based on the user's input.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A digital image device configured to capture and manipulate image data, said digital image device comprising:

a system bus a central processing unit coupled to said system bus;

an input/output device coupled to said system bus, said input/output device configured to provide a user interface; and a memory unit coupled to said system bus, said memory unit having stored therein a database and computer-readable instructions, said computer-readable instructions executed by said central processing unit to provide user assistance to a user of said digital image device by:

performing an analysis of said image data;

automatically recognizing an attribute of said image data based on said analysis;

retrieving from said database said user assistance corresponding to said attribute;

automatically communicating said user assistance to said user to provide user assistance to said user of said digital image device; and automatically adjusting settings of said digital imaging device based on said user assistance for recapture of said image.

2. The digital image device of claim 1 wherein said memory unit is a removable memory unit adapted for use in said digital image device.

3. The digital image device of claim 1 wherein said attribute of said image data includes any combination of: sharpness, brightness, contrast, and color.

4. The digital image device of claim 1 wherein said attribute of said image data includes any combination of: exposure time, shutter speed, f-stop, white balance setting, and focus distance.

5. The digital image device of claim 1 wherein said attribute is an identification tag attached to said image data.

6. The digital image device of claim 1 wherein a time-based condition is recognized and user assistance corresponding to said time-based condition is automatically provided.

7. The digital image device of claim 1 wherein an event-based condition is recognized and user assistance corresponding to said event-based condition is automatically provided.

8. The digital image device of claim 1 wherein a product-based condition is recognized and user assistance corresponding to said product-based condition is automatically provided.

9. A method for providing user assistance to a user of a digital image device, said digital image device configured to capture and manipulate image data, said method comprising the steps of:

a) performing an analysis of said image data;

b) recognizing an attribute of said image data based on said analysis;

c) retrieving from a database said user assistance corresponding to said attribute;

d) automatically communicating said user assistance to said user; and e) automatically adjusting settings of said digital imaging device based on said user assistance for recapture of said image.

10. The method as recited in claim 9 wherein said attribute of said image data includes any combination of: sharpness, brightness, contrast, and color.

11. The method as recited in claim 9 wherein said attribute of said image data is includes any combination of: exposure time, shutter speed, f-stop, white balance setting, and focus distance.

12. The method as recited in claim 9 wherein step a) further comprises the step of:

performing a comparison of a first set of image data to a second set of image data, said first set of image data representing a first portion of an image and said second set of image data representing a second portion of said image.

13. The method as recited in claim 9 wherein step a) further comprises the step of:

performing a comparison of a first set of image data to a second set of image data, said first set of image data representing a first image and said second set of image data representing a second image.

14. The method as recited in claim 9 wherein said attribute is an identification tag attached to said image data.

15. The method as recited in claim 9 further comprising the steps of:

automatically recognizing that a time-based condition is satisfied; and automatically retrieving from said database user assistance corresponding to said time-based condition.

16. The method as recited in claim 9 further comprising the steps of:

automatically recognizing that an event-based condition is satisfied, and automatically retrieving from said database user assistance corresponding to said event-based condition.

17. The method as recited in claim 9 further comprising the steps of:

automatically recognizing that a product-based condition is satisfied; and automatically retrieving from said database user assistance corresponding to said product-based condition.

18. The method as recited in claim 9 wherein step b) further comprises the steps of:

b1) retrieving from said database a query corresponding to said attribute;

b2) automatically communicating said query to said user;

b3) reading a user response to said query; and b4) automatically retrieving from said database user assistance corresponding to said user response.

* * * * *